April 25, 1944.  W. H. SILVER  2,347,373
RIDGE BURSTER
Filed Nov. 6, 1941
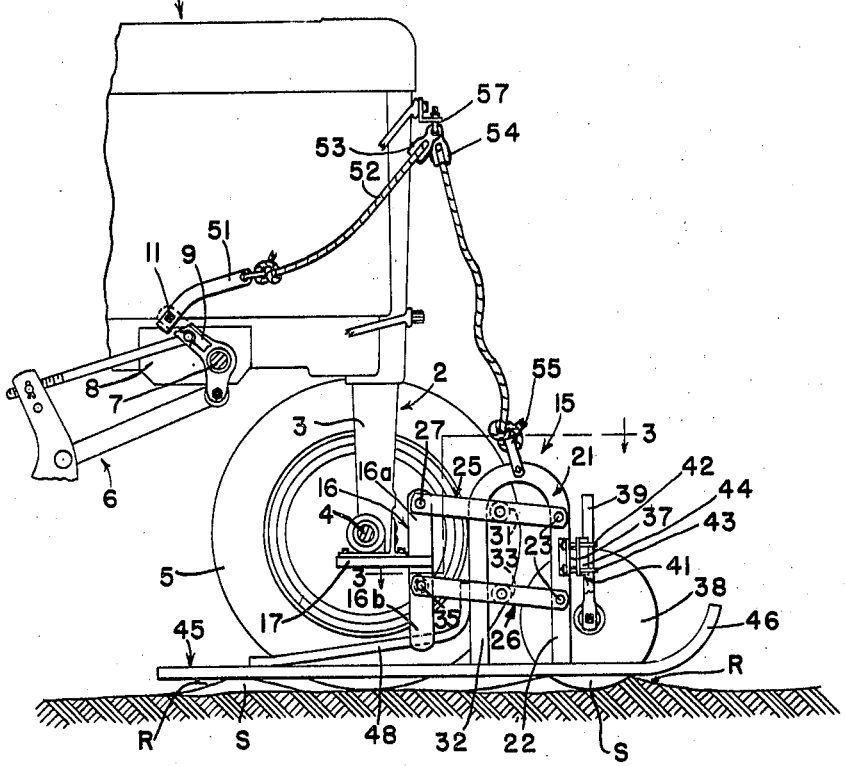
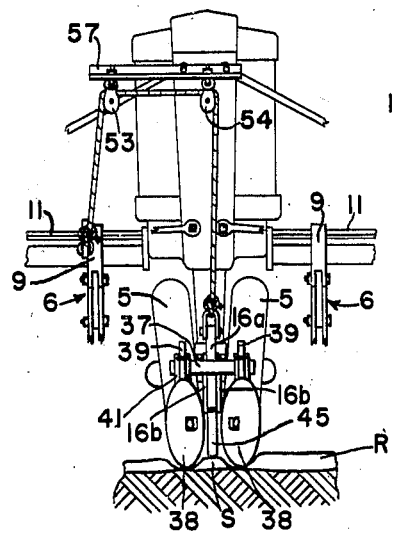
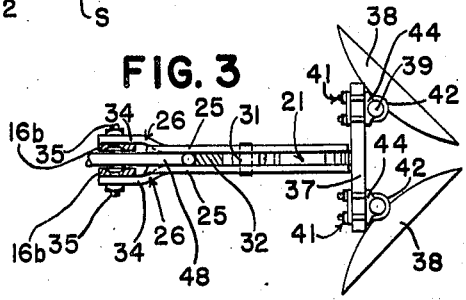
INVENTOR
Walter H. Silver
BY
ATTORNEYS Patented Apr. 25, 1944

2,347,373

UNITED STATES PATENT OFFICE 2,347,373

RIDGE BURSTER

Walter H. Silver, Moline, Ill., assignor to Deere & Company, Moline, Ill., a corporation of Illinois Application November 6, 1941, Serial No. 418,015

14 Claims. (Cl. 37—181)

The present invention relates generally to agricultural machines and more particularly to tractor mounted cultivators and the like.

The object and general nature of the present invention is the provision of new and useful improvements in ground leveling devices particularly adapted to be used with tractors of the row crop or tricycle type, having a front truck with relatively narrow spaced front wheels.

One of the principal features of the present invention is the provision of a ground leveling unit disposed in front of the front tractor wheels and connected with the tractor for free vertical floating movement in both directions, upwardly or downwardly, relative to the tractor, in connection with gauge means carried by the tools and movable therewith, the gauge means being adapted to hold the tools at substantially a constant depth of operation. Heretofore, leveling devices have been proposed which are gauged from the tractor, the purpose of such devices being to cut through ridges and other ground irregularities so that the front wheels of the tractor will not bounce up and down, as sometimes occurs when driving the tractor across hilled rows or ridges or other ground inequalities. In devices where the leveling tool or tools is connected with the tractor, it will be seen that if the tools should start to cut unevenly, the tractor in passing over such unevenness would tend to cause the tools to cut even more unevenly, with the subsequent result that the tractor is subjected to increased bouncing or oscillations, thus aggravating the bouncing, not withstanding the presence of ridge cutting tools. According to the principles of the present invention, the tools are gauged entirely from the tops of the ridges and are capable of free movement relative to the tractor either upwardly or downwardly, whereby any bouncing or oscillations of the tractor cannot result in uneven operation by the tools.

A further feature of the present invention is the provision of a leveling attachment for tractors of the row crop or tricycle type in which a relatively long gauge member is used and which is disposed substantially midway underneath the steering truck of the tractor, the gauge member being steered with the leveling tools and the front truck. By disposing the elongated gauge member in this fashion, the gauge member is displaced only a minimum amount by the turning movements of the truck. Still further, it is a feature of this invention to provide raising means for raising the leveling unit out of operating position, which raising means is so constructed and arranged that the above mentioned free floating movement of the leveling tools, leaving the same to be gauged entirely from the ground surface, is not disturbed by the presence of the lifting connections, this feature of the present invention being more particularly concerned with the feature of utilizing the leveling attachment in connection with cultivating tools in order to facilitate cross cultivating.

These and other objects and advantages of the present invention will be apparent to those skilled in the art after a consideration of the following detailed description, taken in conjunction with the accompanying drawing, in which Figure 1 is a side view of a portion of the tractor cultivating outfit in which the present invention has been embodied;

Figure 2 is a front view of the tractor and leveling unit shown in Figure 1; and Figure 3 is a horizontal sectional view taken generally along the line 3—3 of Figure 1.

Referring now more particularly to Figures 1 and 2, the reference numeral 1 indicates the tractor of the tricycle or row crop type embodying widely spaced rear wheels (not shown) and a dirigible front truck structure indicated in its entirety by the reference numeral 2. The front truck unit 2 includes a pedestal 3 upon which the front of the tractor is supported, the pedestal being rotatable about a generally vertical axis and at its lower end carrying a laterally extending axle 4 upon which a pair of relatively closely spaced front wheels 5 are journaled. In Figure 1 the near front wheel has been removed in order to show to better advantage the leveling unit described below. The tractor 1 carries right and left hand cultivator units 6 of conventional construction. Each unit includes a horizontal laterally outwardly extending draft beam 7 to the inner end of which an attaching plate 8 is secured. The draft beam 7 carries a number of brackets 9 to which the cultivator rigs are connected, and the brackets 9 also serve as supports for a rock shaft 11 by which the rigs may be raised and lowered.

The leveling device, with which the present invention is more particularly concerned and which is indicated in its entirety in Figure 1 by the reference numeral 15, comprises an attaching member or standard 16 which is disposed generally vertically and includes an upper part 16a, a pair of lower laterally spaced parts 16b and a bracket 17 to which the lower end of the part 16a and the upper ends of the lower parts 16b are welded. The bracket 17 is apertured to receive a plurality of bolts by which the member 16 may be rigidly secured to the lower end of the pedestal 3. The latter forms a part of the front truck 2 and is turnable about a vertical axis to provide for steering the wheels 5.

A tool standard 21 in the form of an inverted U-shaped member is disposed forwardly of the standard 16 and has its forward leg 22 apertured to receive a pair of pivot pins 23 upon which the forward ends of upper and lower pairs of link members, indicated at 25 and 26, respectively, are pivotally mounted. The rear ends of the upper links 25 are connected by a pivot bolt 27 with the upper end of the standard 16. As best shown in Figure 3, the two links 25 making up the upper link member, are held in spaced apart relation by a bushing 31 and embrace relatively closely the rear leg 32 of the U-shaped tool standard 21. The rear ends of the links 26 are bent laterally outwardly, as at 34 (Figure 3), and the laterally outwardly bent ends 34 of the lower links 26 are apertured to receive a pair of countersunk bolts 35 which pivotally connect the lower links 26 to the standard 16. The links 25 and 26 are disposed generally in parallelism and provide a vertical floating connection between the front truck 2 and the tool standard 21, whereby the latter is free to move either upwardly or downwardly relative to the tractor so that no normal movement of the latter when traversing uneven ground will lift the leveling device from the ground.

A transverse tool bar 37 is fixed, as by welding, to the front blade 22 of the U-shaped tool standard 21, and a pair of tool members 38, preferably in the form of disks, is connected with the bar 37. Preferably, each disk 38 is journaled to an upwardly extending shank 39, and by means of a suitable clamp 41, each shank may be clamped to the bar 37 in different positions of both lateral and vertical adjustment. Preferably, each clamp member 41 includes a pair of U-bolts 42 and 43 and a cooperating saddle member 44. Each clamp may be adjusted along the bar 37 and each shank may be adjusted vertically in the associated clamp 41. Preferably, as best shown in Figure 2, the disks 38 are adjusted so as to be disposed directly in front of the associated tractor front wheels 5. From this figure it will be seen that the employment of disks 38 has a particular advantage when the tractor wheels are equipped with pneumatic tires, for the disks 38 cut through the ridges and form a round bottomed path which conforms approximately to the section of the pairs of the front wheels. It will also be seen from Figure 2 that the disks 38 are spaced apart laterally a distance that not only corresponds to the spacing of the lower portions of the front tractor wheels 5 but also that the spacing is such that sections S of undisturbed soil are left intact.

The tool carrying standard 21 is connected, as mentioned above, for free floating movement with respect to the tractor and the tractor carried standard 16 by means of the parallel links 25 and 26. It is desirable, however, to provide means for determining the depth of operation of the disks 38, and to this end I provide an elongated ground engaging gauge rod 45 secured, as by welding, to the lower ends of the leg portions 22 and 32 of the tool standard 21. At its forward end the rod 45 is provided with an upturned sled runner end 46, and the rear portion of the gauge member 45 is reenforced by a brace rod 48 secured, as by welding, to the rear end portion of the rod 45 and to the rear leg 32 of the tool standard 21. The brace rod 48 moves vertically between and is guided by the two standard sections 16b. As best shown in Figure 1, the length of the gauge member 45 is such that the gauge member spans at least two ridges, and as best shown in Figure 2, the gauge rod 45 is disposed in the space between the disks 38 and also between the tractor wheels 5, the rod thus riding along the undisturbed soil sections S. By adjusting the disk shanks 39 vertically in the associated clamps 41, the disks 38 may be disposed to cut through the ridges, which are indicated by the reference numeral R, to exactly the depth desired to provide a smooth path for the movement of the tractor wheels when traveling across the field, yet by virtue of the free floating movement of the leveling unit 15 and the fact that it is gauged solely from the undisturbed ground, it will be seen that movement of the tractor relative to the tools 38 will have no effect upon changing the operating position of the tools.

The leveling attachment of the present invention is adapted for use under any conditions where the tractor is required to cross ridged land or under other conditions where the ground is rough or uneven and is loose enough to be readily worked by the leveling disks 38, in which case the gauge member 45 is long enough to ride along the tops of the uneven ground sections, thus positioning the leveling tools 38 in the necessary relation to form smooth paths for the wheels 5. Generally, however, a device of this kind is used more frequently in cross cultivating row crops such as corn and the like, and in order to accommodate the raising and lowering of the leveling unit 15 at the ends of the fields, I provide an arm 51 on one of the cultivator lifting rock shafts 11, and I extend a cable or other flexible element 52 from the outer end of the arm 51 through a pair of sheaves 53 and 54 and then downwardly to a loop 55 pivoted to the upper portion of the tool standard 21. The two sheaves 53 and 54 are mounted in a cross member 57 that is bolted to the front of the tractor. From Figure 2 it will be seen that the sheaves 53 and 54 are so placed that the portion of the cable 52 leading downwardly to the tool standard 21 is disposed substantially in a vertical longitudinal plane while the portion of the cable 52 that leads upwardly from the actuating arm 51 is disposed in a vertical longitudinal plane passing through or adjacent the arm 51. During normal operation, and as shown in Figure 1, the cable 52 is slack so that the normal free vertical movement of the leveling disks 38 is not disturbed, yet when the cultivator rock shafts 11 are actuated to raise the cultivator rigs, the arm 51 is swung in a clockwise direction (Figure 1) and tightens the cable 52 and acts through the latter to raise the unit 15 to its transport position. Thus, even though I have provided means on the tractor for raising the leveling unit into inoperative position, such means is so constructed and arranged that during normal operation the free floating movement of the unit is not interfered with and the unit may therefore be gauged entirely by contact with the tops of the ridges or other uneven sections.

While I have shown and described above the preferred structure in which the principles of the present invention have been incorporated, it is to be understood that, in fact, widely different means may be employed in the practice of the broader aspects of my invention.

What I claim, therefore, and desire to secure by Letters Patent is:

1. A leveling device for a tractor of the type having a steerable front truck swingable about a generally vertical axis during steering and including a pair of spaced apart front wheels, said attachment comprising ground leveling tools floatingly connected with said front truck and disposed, respectively, in front of said wheels to clear smooth paths for the latter, said tools being connected with said truck so as to turn with the latter during steering, and an elongated ground engaging gauge member connected with said tools to control the depth of operation thereof and extending in a generally fore and aft direction and disposed substantially underneath the vertical axis of steering movement of said truck, said tools being spaced apart laterally so as to leave undisturbed sections of ground therebetween upon which said elongated gauge member is adapted to pass for gauging the depth of operation of said tools, said gauge member being disposed underneath said vertical axis of steering movement and extending both fore and aft with respect thereto so as to minimize the lateral shifting movement of said gauge member during steering movement of said truck.

2. A leveling device for a tractor of the tricycle type having a steerable front truck including a pair of relatively closely spaced front wheels, said attachment comprising a standard adapted to be rigidly fixed to said truck to move therewith, a pair of ground leveling tools floatingly connected with said standard and disposed, respectively, in front of said wheels to clear smooth paths for said wheels, said tools being spaced apart a distance corresponding to the spacing of said wheels and adapted to leave a small section of undisturbed ground therebetween, and an elongated ground-engaging gauge connected to move vertically with said tools, said gauge extending both fore and aft of said standard and steerable with the latter and said tools.

3. A leveling device for a tractor of the tricycle type having a steerable front truck including a pair of relatively closely spaced front wheels, said attachment comprising a pair of ground leveling tools floatingly connected with said tractor and disposed, respectively, in front of said wheels to clear smooth paths for said wheels, said tools being spaced apart a distance corresponding to the spacing of said wheels and adapted to leave a small section of undisturbed ground therebetween, and an elongated ground engaging gauge member connected to move vertically with said tools, said gauge member extending between and forwardly beyond said tools and also between and rearwardly beyond said tractor front wheels so as to gauge the depth of operation of said tools from the top portions of the sections of undisturbed ground between said tools and wheels.

4. A leveling device for a tractor having a steerable front truck including a pair of spaced front wheels, said attachment comprising a standard adapted to be rigidly fixed to said truck to move therewith, a pair of ground leveling tools, a standard to which said tools are connected, generally parallel links connecting said standards whereby said tools are capable of generally vertical floating movement relative to said tractor truck standard, said tools being disposed, respectively, in front of said front wheels to clear smooth paths for said wheels, said tools being spaced apart so as to leave small sections of undisturbed ground therebetween, and an elongated ground engaging gauge member fixed to said tool standard and adapted to contact said undisturbed ground sections for determining the operating position of said tools.

5. A leveling device for a tractor having front wheel means associated therewith, said attachment comprising ground leveling tool means disposed in front of said front wheel means, generally parallel links floatingly connecting said tool means with said tractor so as to be free to move relative to the latter either upwardly or downwardly and to provide for movement of the tractor without moving said leveling tool means and gauge means fixed to move with said tool means and adapted to contact undisturbed ground for determining the depth of operation of the latter independently of movement of the tractor relative to the tool means.

6. A leveling device for a tractor having a steerable front truck including a pair of relatively closely spaced front wheels, said attachment comprising a standard adapted to be rigidly fixed to said truck to move therewith, a tool standard, a pair of generally parallel links connecting said standards whereby said tool standard is capable of generally vertical floating movement relative to the tractor, a pair of laterally spaced ground leveling tools fixed to said tool standard, and a ground engaging gauge member fixed to said tool standard and extending generally fore and aft between said tools and said ground wheels and adapted to contact undisturbed ground therebetween.

7. A leveling device for a tractor of the tricycle type for facilitating the travel of the tractor across rigid ground and the like, said tractor having a steerable front truck and a pair of relatively closely spaced front wheels steered by movement of said front truck about a generally vertical axis relative to the tractor, said attachment comprising a standard adapted to be fixed to the lower end of said front truck, a tool carrying standard including a transverse bar, a pair of tools connected, respectively, with the ends of said bar and spaced apart laterally corresponding to the spacing of said front tractor wheels, a pair of generally parallel vertically swingable links connecting said standards and providing for floating movement of said tools relative to the tractor, and an elongated gauge member extending fore and aft between said tools and wheels and fixed to said tool standard, said gauge member having a length sufficient to contact at least two ridges and ride along the upper portions thereof, said tools being disposed so as to have portions lying below said gauge member whereby in operation said tools cut across said ridges and form smooth paths for said front truck wheels, the depth of operation of said tools being unaffected by movement of the tractor relative to said tools.

8. A leveling attachment for wheeled vehicles to facilitate travel of the latter over uneven ground, said attachment comprising a member adapted to be fixed to the vehicle, a tool standard carrying tool means disposed in front of at least one of the wheels of said vehicle, a pair of generally parallel links connecting said tool standard with said member to provide for relatively free floating movement of said standard and tool means relative to the vehicle, and means connected in substantially fixed relation with respect to said standard and engageable with the tops of the sections of uneven ground for gauging the depth of operation of said tool means irrespective of the position of the tractor relative thereto.

9. A leveling attachment for wheeled vehicles to facilitate travel of the latter over uneven ground, said attachment comprising a member adapted to be attached to the vehicle in a generally vertical position, a generally vertically disposed tool standard, a pair of generally vertically spaced approximately parallel links connecting said member and said standard to provide for generally vertical floating movement of the latter relative to the vehicle, an elongated gauge member fixed to said tool standard and adapted to run along the tops of the sections of uneven ground, and tool means fixed to said tool standard and extending below said gauge member for cutting through said uneven ground portions to provide a smooth path for at least one of the vehicle wheels, said tool means operating at a depth that is determined by the position of the tool means below said gauge and independent of the position of the tractor relative to said tool means.

10. A leveling attachment for wheeled vehicles and the like, comprising a standard adapted to be connected to the tractor, a generally U-shaped member serving as a tool standard and disposed generally in the plane of said first-mentioned standard, a pair of parallel links connecting the upper and lower portions of said first-mentioned standard with the forward leg of said U-shaped member, a transverse bar fixed to said forward leg, a pair of ground leveling tools connected to said transverse bar, the rear leg of said U-shaped member being disposed adjacent said first-mentioned standard, and a ground-engaging member fixed to the lower portions of the legs of said U-shaped member.

11. A leveling attachment comprising an attaching standard adapted to be disposed vertically, an inverted U-shaped member disposed generally in the plane of said standard, upper and lower pairs of link members pivotally connecting the upper and lower portions of said standard to the upper and lower portions of the forward leg of said inverted U-shaped member, the rear leg of said U-shaped member being disposed between the link members of said upper and lower pairs of links, tool means carried by said U-shaped member, and a generally longitudinally extending gauge member fixed to the lower ends of the legs of said U-shaped member.

12. A leveling device for a tractor having a stearable front truck and front wheel means associated therewith, said attachment comprising a standard adapted to be rigidly fixed to said truck, ground leveling tool means disposed in front of said front wheel means, generally parallel links floatingly connecting said tool means with said standard, the standard including two laterally spaced sections, and means on said tool means movable between said sections in guided relation.

13. A leveling device for a tractor of the type having a steerable front truck swingable about a generally vertical axis during steering and including front wheel means, said attachment comprising ground leveling tool means floatingly connected with said front truck and disposed in front of said front wheel means to clear a smooth path for the latter, said tool means being connected with said truck so as to turn with the latter during steering, and an elongated ground engaging gauge member connected with said tool means to control the depth of operation thereof and extending in a generally fore and aft direction and disposed substantially underneath the vertical axis of steering movement of said truck and extending both fore and aft with respect thereto so as to minimize the lateral shifting movement of said gauge member during steering movement of said truck.

14. The combination with a tractor having a steerable truck or the like movable about a substantially vertical axis, of tool means floatingly connected with said steerable truck, and ground engaging gauge means connected with said tool means and disposed underneath said vertical axis of steering movement of the truck so as to minimize the lateral shifting movement of said gauge means during steering movement of said truck.

WALTER H. SILVER.

CERTIFICATE OF CORRECTION.

Patent No. 2,347,373. April 25, 1944.

WALTER H. SILVER.

It is hereby certified that error appears in the printed specification of the above numbered patent requiring correction as follows: Page 3, second column, line 37, claim 7, for the word "rigid" read --ridged--; and that the said Letters Patent should be read with this correction therein that the same may conform to the record of the case in the Patent Office.

Signed and sealed this 13th day of June, A. D. 1944.

Leslie Frazer (Seal) Acting Commissioner of Patents.